L. BRADEN.
TRANSMISSION GEARING FOR MOWING MACHINES.
APPLICATION FILED JUNE 28, 1916.

1,226,455.

Patented May 15, 1917.
2 SHEETS—SHEET 1.

WITNESSES
E. M. Callaghan
Myron J. Clear

INVENTOR
LINCOLN BRADEN,
BY
ATTORNEYS

L. BRADEN.
TRANSMISSION GEARING FOR MOWING MACHINES.
APPLICATION FILED JUNE 28, 1916.
1,226,455.
Patented May 15, 1917.
2 SHEETS—SHEET 2.
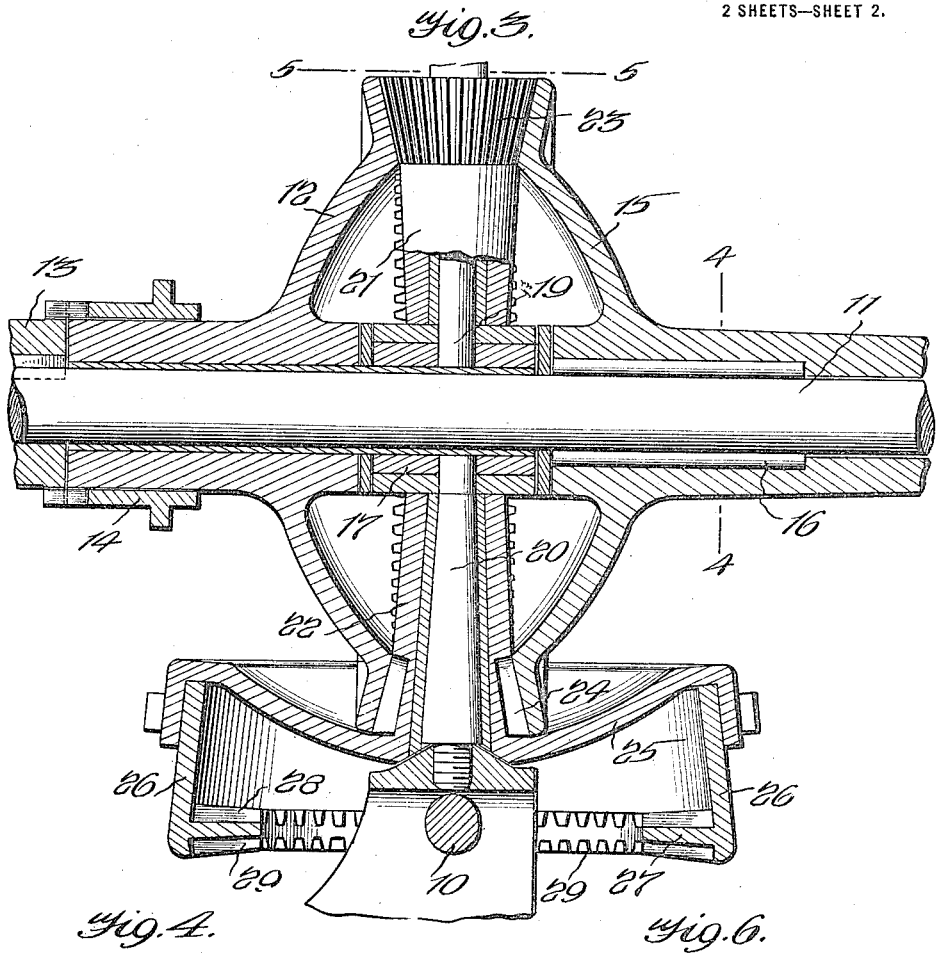
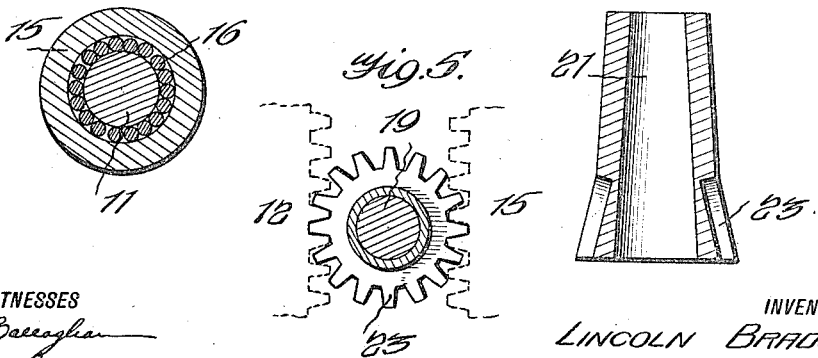
WITNESSES
INVENTOR
LINCOLN BRADEN,
BY
ATTORNEYS

UNITED STATES PATENT OFFICE.

LINCOLN BRADEN, OF CARBON, CALIFORNIA.

TRANSMISSION-GEARING FOR MOWING-MACHINES.

1,226,455. Specification of Letters Patent. Patented May 15, 1917.

Application filed June 28, 1916. Serial No. 106,350.

*To all whom it may concern:*

Be it known that I, LINCOLN BRADEN, a citizen of the United States, and a resident of Carbon, in the county of Shasta and State of California, have invented a certain new and useful Improvement in Transmission-Gearing for Mowing-Machines, of which the following is a specification.

My present invention relates particularly to mowing machine gearing, and aims to provide a novel transmission of a simple, effective nature for the purposes, and to the advantages, to be presently described in detail.

Among the objects of my present invention, I aim to provide a transmission gearing for mowing machines in which there are two driving connections with the pitman shaft, these driving connections engaging opposite sides of the shaft so that their thrust is in opposite directions, the thrust of one counterbalancing the thrust of the other, so as to eliminate as far as is possible in this way, the friction in the bearings of the driven end of the pitman shaft.

My invention further aims to provide a transmission gearing for mowing machines, the construction of which permits the pitman shaft to be placed in a position more nearly approximating the horizontal than is possible with the transmission gearings now in use, and to thus do away with the greater part of what is known as "wringing" motion of the pitman common to all machines in which the rear end of the pitman shaft is of necessity much higher than the crank or forward end.

A further object is to accomplish this latter advantage without sacrificing either the standardized clearance below the main shaft or axle of the machine, or the standardized length of the pitman shaft itself.

Still further my invention aims to provide a transmission gearing for mowing machines whose special construction will avoid the lifting of the left hand side of the main frame of the machine, and the throwing of additional weight upon the shaft of the master gear, such as takes place in all machines where a single pinion is used in connection with said gear, and is located to the rear of the main shaft or axle of the machine, and likewise to avoid the tendency of the master gear to climb up on the main frame of the machine, adding to the weight of the main frame, such as takes place where a single pinion is utilized and is located in front of the main shaft or axle of the machine.

With these objects in mind the particular construction I utilize may be better understood and more thoroughly appreciated from the following description thereof, reference being made to the accompanying drawings forming a part of this specification, and wherein—

Fig. 3 is a vertical sectional view taken substantially on line 3—3 of Fig. 1.

Fig. 4 is a detail vertical section taken substantially on line 4—4 of Fig. 3.

Fig. 5 is a detail sectional plan view taken substantially on line 5—5 of Fig. 3.

Fig. 6 is a detail section of the upper connecting gear removed.

Figure 1:
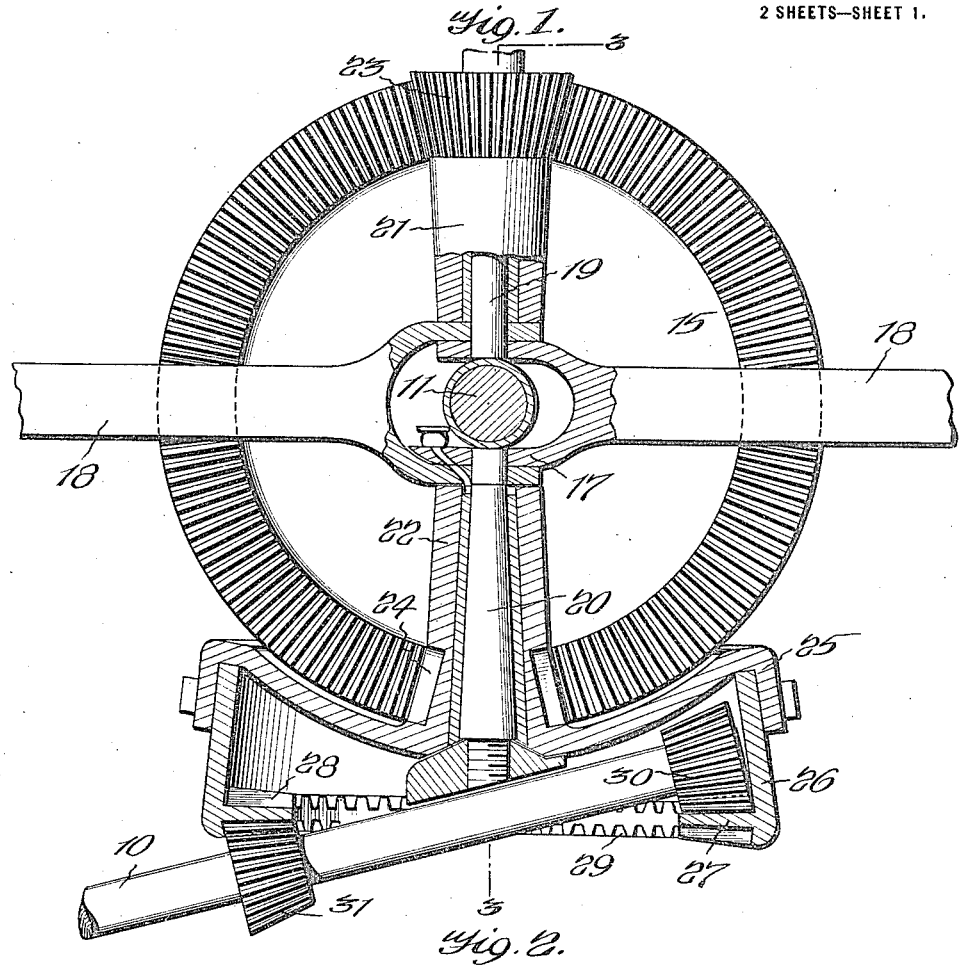
Figure 1 is a vertical sectional view through my improved gearing.
Figure 2:
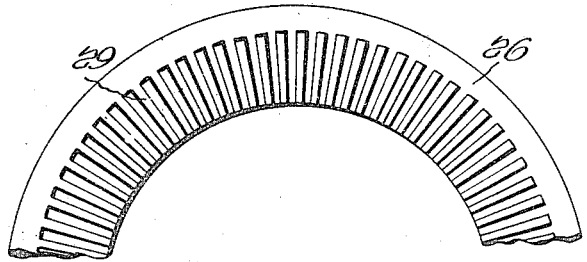
Fig. 2 is a bottom plan view of a portion of the gear ring.

Referring now to these figures, in which the pitman shaft is clearly seen at 10 in Figs. 1 and 3, and the main shaft or axle 11 is likewise clearly seen at 11 in Figs. 1 and 3, the master gear 12 is loosely disposed upon the main shaft or axle 11 and is in the form of a bevel gear, adjacent to a rigid sleeve 13, to which the gear may be secured through a sliding clutch member 14, the master gear so disposed being opposed to a similar bevel gear 15 also loosely disposed upon the main shaft or axle 11 and spaced from the master gear.

The gear 15 is preferably provided with a counterbore in which a series of rollers 16 are disposed around the shaft 11, as plainly seen by reference to Figs. 3 and 4, the space between the master gear 12 and the opposed gear 15 just mentioned being occupied by the inner overlapping portions 17 of arms 18 forming part of the framework of the machine, the said inner overlapping portions 17 of which form bearings for the inner ends of short shafts 19 and 20, axially alined with one another in a direction at right angles to the axis of the shaft 11 at diametrically opposite sides thereof.

Upon the shafts 19 and 20 thus disposed, are mounted sleeves 21 and 22 each having at their outer ends bevel gears 23 and 24, between and in mesh with the gears 12 and 15 at diametrically opposite sides thereof, so that rotation of the main shaft or axle 11 communicated through its master gear 12 will be transmitted by the gear 23 to the gear 15 at one side of the latter, and power thus applied by both the master gear 12 and the gear 15, will be transmitted to the bevel gear 24 at the opposite side of the latter.

By reference to Fig. 3 in particular, it will be noted that the lower end of the sleeve 22 carrying the gear 24, is rigid with a concavo-convex disk 25 the outer edge of which is secured to a gear ring 26 having an inwardly projecting annular flange 27, the upper annular surface of which is provided with teeth 28 and the lower annular surface of which is provided with teeth 29.

The pitman shaft 10 is provided with spaced bevel gears 30 and 31, inclined in relatively opposite directions, so that with the inclination of the pitman shaft and its extension diametrically across the gear ring 26, its gears 30 and 31 are adapted respectively for engagement with the upper and lower toothed surfaces 28 and 29 of the flange 27.

Thus, rotation transmitted to the gear 24 in the manner before described, is transferred to the pitman shaft 10 in such manner as to balance the thrust upon the latter, and it is to be observed that the thrust upon the several parts rotated is likewise balanced by their particular disposition and relative arrangement.

I claim:

1. In mowing machine gearing, the combination with the main shaft or axle and the pitman shaft, of a pair of spaced oppositely inclined bevel gears carried by the pitman shaft, and gearing between the pitman shaft gears and the main shaft or axle, including a gear ring diametrically of which the pitman shaft extends, said gear ring having vertically spaced annularly toothed surfaces with which the said gears of the pitman shaft engage.

2. In mowing machine gearing, the combination with the main shaft or axle, and the pitman shaft, of a pair of oppositely inclined bevel gears carried by the pitman shaft and spaced thereon, and gearing between the pitman shaft gears and the main shaft or axle, including a horizontally disposed gear ring diametrically of which the pitman shaft projects, said gear ring having an internal annular flange, the upper and lower surfaces of which are toothed and respectively engaged by the gears of the pitman shaft.

3. In mowing machine gearing, the combination with the main shaft or axle, and the pitman shaft, of a master gear carried by the main shaft, a gear loosely disposed on the main shaft and opposing the master gear, intermediate gears connecting the said master gear and its opposed gear at diametrically opposite points, and gearing connections between one of said intermediate gears and the pitman shaft.

4. In mowing machine gearing, the combination with the main shaft or axle, and the pitman shaft, of a master gear carried by the main shaft, a gear loosely disposed on the main shaft and opposing the master gear, intermediate gears connecting the said master gear and its opposed gear at diametrically opposite points, and gearing connections between one of said intermediate gears and the pitman shaft, said last named means including a horizontally disposed gear ring rigid with the respective intermediate gear.

5. In mowing machine gearing, the combination with the main shaft or axle, and the inclined pitman shaft, of opposed gears mounted on the main shaft, intermediate gears connecting said opposing gears at diametrically opposite points thereof, a gear ring rigid with one of said intermediate gears and diametrically of which the pitman shaft extends, and vertically spaced oppositely inclined gears engaging the said gear ring and carried by the pitman shaft, all for the purpose described.

LINCOLN BRADEN.

Copies of this patent may be obtained for five cents each, by addressing the "Commissioner of Patents, Washington, D. C."